US012460475B2

(12) United States Patent
Jackson et al.

(10) Patent No.: US 12,460,475 B2
(45) Date of Patent: Nov. 4, 2025

(54) MOTORIZED SLAT ANGLE ADJUSTMENT MECHANISM FOR WINDOW BLINDS

(71) Applicant: Home Depot Product Authority, LLC, Atlanta, GA (US)

(72) Inventors: Nicholas Jackson, Marietta, GA (US); Nicholas Servies, Kennesaw, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 1131 days.

(21) Appl. No.: 16/920,554

(22) Filed: Jul. 3, 2020

(65) Prior Publication Data

US 2020/0399954 A1 Dec. 24, 2020

Related U.S. Application Data

(63) Continuation-in-part of application No. 15/857,294, filed on Dec. 28, 2017, now Pat. No. 11,142,944.

(51) Int. Cl.
*E06B 9/28* (2006.01)

(52) U.S. Cl.
CPC .......... *E06B 9/28* (2013.01); *E06B 2009/285* (2013.01)

(58) Field of Classification Search
CPC ...... E06B 9/28; E06B 2009/285; E06B 9/307; E06B 9/304; E06B 9/303; E06B 2009/6845; E06B 9/32
See application file for complete search history.

(56) References Cited

U.S. PATENT DOCUMENTS

| | | | | |
|---|---|---|---|---|
| 4,621,672 A * | 11/1986 | Hsu | E06B 9/307 160/176.1 R |
| 4,621,673 A | 11/1986 | Georgopoulos | |
| 4,719,955 A * | 1/1988 | Tachikawa | E06B 9/388 160/176.1 R |
| 5,052,150 A | 10/1991 | Chen | |
| 5,092,387 A | 3/1992 | King et al. | |
| 5,238,043 A | 8/1993 | Woodring et al. | |

(Continued)

FOREIGN PATENT DOCUMENTS

| | | |
|---|---|---|
| DE | 3518371 | 5/1991 |
| TW | M551651 U | 11/2017 |
| WO | 2011071331 | 6/2011 |

OTHER PUBLICATIONS

The State Intellectual Property Office of People's Republic of China, Office Action issued in 201811609442.0, dated Dec. 29, 2021, 19 pgs.

(Continued)

*Primary Examiner* — Daniel P Cahn
*Assistant Examiner* — Jeremy C Ramsey
(74) *Attorney, Agent, or Firm* — Greenberg Traurig, LLP

(57) ABSTRACT

An apparatus for adjusting a tilt angle of a plurality of slats in a window blind is disclosed. The window blind includes a headrail having disposed therein a shaft that causes the tilt angle of the slats to be adjusted when the shaft is rotated. The apparatus comprises a first bevel gear, a second bevel gear in mechanical communication with the first bevel gear and coupled with the shaft, and a motor coupled to the shaft. Actuation of the first bevel gear causes a corresponding rotation of the shaft to adjust the tilt angle of the slats, and actuation by the motor causes a rotation of the shaft to adjust the tilt angle of the slats.

17 Claims, 9 Drawing Sheets

(56) References Cited

U.S. PATENT DOCUMENTS

| | | | | |
|---|---|---|---|---|
| 5,341,865 | A | 8/1994 | Fraser et al. | |
| 5,472,035 | A | 12/1995 | Biba et al. | |
| 6,283,192 | B1 | 9/2001 | Toti | |
| 6,425,432 | B1 * | 7/2002 | Gross | E06B 9/307 160/176.1 R |
| 6,736,185 | B2 | 5/2004 | Smith et al. | |
| 6,845,802 | B1 | 1/2005 | Andrson et al. | |
| 6,973,952 | B2 | 12/2005 | Nien | |
| 7,194,840 | B2 | 3/2007 | Zimmermann | |
| 7,717,153 | B2 | 5/2010 | Gramsch | |
| 7,802,608 | B2 | 9/2010 | Anderson et al. | |
| 8,251,119 | B2 | 8/2012 | Toti | |
| 9,574,396 | B2 | 2/2017 | Toti | |
| 2010/0263808 | A1 | 10/2010 | Hanley et al. | |
| 2010/0269987 | A1 | 10/2010 | Martin et al. | |
| 2011/0100564 | A1 | 5/2011 | McTaggert | |
| 2011/0253321 | A1 | 10/2011 | Yu et al. | |
| 2012/0125543 | A1 * | 5/2012 | Chambers | E05F 15/79 700/275 |
| 2016/0201388 | A1 * | 7/2016 | Wen | E06B 9/307 160/176.1 P |
| 2017/0067286 | A1 * | 3/2017 | Hall | E06B 9/38 |
| 2017/0081912 | A1 | 3/2017 | Guillory | |
| 2018/0030780 | A1 * | 2/2018 | Barnett | E06B 9/364 |
| 2019/0003252 | A1 | 1/2019 | Huang et al. | |

OTHER PUBLICATIONS

The State Intellectual Property Office of People's Republic of China, Office Action issued in 201811609442.0, dated Dec. 29, 2021, 19 pgs.—translation.

Self-locking worm gears: Fact or fiction?, Dr. Albert V. Karvelis, Mar. 1, 2000, accessed Jun. 12, 2020 from https://www.machinedesign.com/motors-drives/article/21834661/selflocking-worm-gears-fact-or-fiction (Year: 2000), 9 pgs.

Chinese Patent Office, 2nd Office Action issued in Application No. 201811609442.0, dated Jun. 20, 2022, 6 pgs.

United States Patent and Trademark Office, Non-Final Office Action issued in U.S. Appl. No. 15/857,294, dated Sep. 15, 2020, 16 pgs.

Office Action from Mexican application No. MX/a/2023/004776, dated Feb. 29, 2024, 5 pp.

Office Action from Canadian application No. 3,023,755, dated Dec. 13, 2023, 8 pp.

Office Action from Canadian application No. 3,122,824, dated Dec. 12, 2023, 3 pp.

* cited by examiner

180 Degrees

90 Degrees

Zero Degrees

MOTORIZED SLAT ANGLE ADJUSTMENT MECHANISM FOR WINDOW BLINDS

CROSS-REFERENCE TO RELATED APPLICATION

This application is a continuation-in-part of U.S. application Ser. No. 15/857,294, currently pending, which is hereby incorporated by reference in its entirety.

BACKGROUND

Slat angle adjustment mechanisms in conventional horizontal window blinds typically utilize a wand connected to a worm gear. Conventionally, the worm gear was necessary because the last amount of slat rotation to completely close the slats requires considerable torque, and the weight of the slats causes a "back-drive," which rotates the slats down so that they are not completely closed. Worm gears provide the necessary torque to completely close the slats and also have relatively high friction, which resists the back-drive. However, because worm gears have a relatively large gear ratio, they also require many turns to close the slats and therefore are slow and inconvenient.

SUMMARY

In a first aspect, an example apparatus for adjusting a tilt angle of a plurality of slats in a window blind is provided. The window blind may include a headrail having disposed therein a shaft that causes the tilt angle of the slats to be adjusted when the shaft is rotated. The apparatus may include a rod having a first end and a second end, the first end adapted to couple with a wand. The apparatus may further include a first bevel gear coupled with the rod, a second bevel gear in mechanical communication with the first bevel gear and coupled with the shaft, and a motor coupled to the shaft. A rotation of the wand may cause a corresponding rotation of the shaft to adjust the tilt angle of the slats, and actuation by the motor may cause a rotation of the shaft to adjust the tilt angle of the slats.

In an embodiment, actuation by the motor causes a rotation of the second bevel gear.

In an embodiment, actuation by the motor causes a rotation of the first bevel gear.

In an embodiment, actuation by the motor causes rotation of the rod.

In an embodiment, actuation by the motor causes rotation of the wand.

In an embodiment, the motor is disposed within the headrail.

In an embodiment, the apparatus further includes two pulleys coupled with the shaft and the slats, wherein the pulleys cause adjustment of the tilt angle of the slats in response to rotation of the shaft, wherein the pulleys are disposed within the headrail.

In an embodiment, the motor is disposed between the two pulleys.

In an embodiment, the first bevel gear includes a bore passing axially therethrough that is sized and shaped to receive the second end of the rod, wherein the first bevel gear rotates with the rod, and the second bevel gear comprises a bore passing axially therethrough that is sized and shaped to receive the shaft, wherein the shaft rotates with the second bevel gear.

In an embodiment, the gear ratio of the second gear relative to the first gear is equal to or less than 1:1.

In a second aspect of the instant disclosure, an example system is provided that may include an apparatus for adjusting a tilt angle of a plurality of slats in a window blind, the window blind including a headrail having disposed therein a shaft that causes the tilt angle of the slats to be adjusted when the shaft is rotated. The apparatus may include a rod having a first end and a second end, the first end adapted to couple with a wand, a first bevel gear coupled with the rod, a second bevel gear in mechanical communication with the first bevel gear and coupled with the shaft, and a motor coupled to the shaft. A rotation of the wand may cause a corresponding rotation of the shaft to adjust the tilt angle of the slats. Actuation by the motor may cause a rotation of the shaft to adjust the tilt angle of the slats. The system may further include an input command mechanism configured for communication with the motor, wherein user actuation of the input command mechanism causes the input command mechanism to command actuation of the motor.

In an embodiment, the input command mechanism comprises computer-readable instructions that, when executed by a processor, cause the processor to command actuation of the motor.

In an embodiment, the input command mechanism comprises an application for a mobile computing device.

In an embodiment, the input command mechanism comprises the mobile computing device.

In an embodiment, the system further includes a receiver, coupled to the motor, configured to receive actuation commands from the input command mechanism wirelessly.

In an embodiment, the first bevel gear comprises a bore passing axially therethrough that is sized and shaped to receive the second end of the rod, wherein the first bevel gear rotates with the rod, and the second bevel gear comprises a bore passing axially therethrough that is sized and shaped to receive the shaft, wherein the shaft rotates with the second bevel gear.

In an embodiment, actuation by the motor causes a rotation of the second bevel gear.

In an embodiment, actuation by the motor causes a rotation of the first bevel gear.

In an embodiment, actuation by the motor causes rotation of the rod.

In an embodiment, actuation by the motor causes rotation of the wand.

In a third aspect of the present disclosure, an example apparatus for adjusting a tilt angle of a plurality of slats in a window blind is provided, the window blind including a headrail having disposed therein a shaft that causes the tilt angle of the slats to be adjusted when the shaft is rotated. The example apparatus includes a first bevel gear comprising a bore passing axially therethrough that is perpendicular to the shaft, a second bevel gear in mechanical communication with the first bevel gear and coupled with the shaft, and a motor coupled to the shaft. Actuation of the first bevel gear causes a corresponding rotation of the shaft to adjust the tilt angle of the slats, and actuation by the motor causes a rotation of the shaft to adjust the tilt angle of the slats.

In an embodiment, the bore of the first bevel gear is configured to receive a rod for manual actuation of the slats, wherein the first bevel gear rotates with the rod.

In an embodiment, the second bevel gear comprises a bore passing axially therethrough that is sized and shaped to receive the shaft, wherein the shaft rotates with the second bevel gear.

In an embodiment, actuation by the motor causes a rotation of the second bevel gear.

In an embodiment, actuation by the motor causes a rotation of the first bevel gear.

In an embodiment, the apparatus further includes two pulleys coupled with the shaft and the slats, wherein the pulleys cause adjustment of the tilt angle of the slats in response to rotation of the shaft, wherein the pulleys are disposed within the headrail.

In an embodiment, the gear ratio of the second gear relative to the first gear is equal to or less than 1:1.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures and components have not been described in detail as not to unnecessarily obscure aspects of the present invention.

Various embodiments overcome the drawbacks of conventional worm gear-based slat adjustment mechanisms in window blinds by providing an improved, variable-speed and -torque slat adjustment mechanism that provides for higher speed slat rotation when less torque is needed and higher torque when more torque is needed (e.g., to completely close the slats). Various embodiments include one or more bevel gears, which have a lower gear ratio, and thus provide faster rotation, than a conventional worm gear. Various embodiments also include a pulley with a varying radial profile, which causes slat adjustment torque to increase (and thus slat adjustment speed to decrease), at least in part, as the slats are adjusted from an open position to a closed position.

Figure 1:
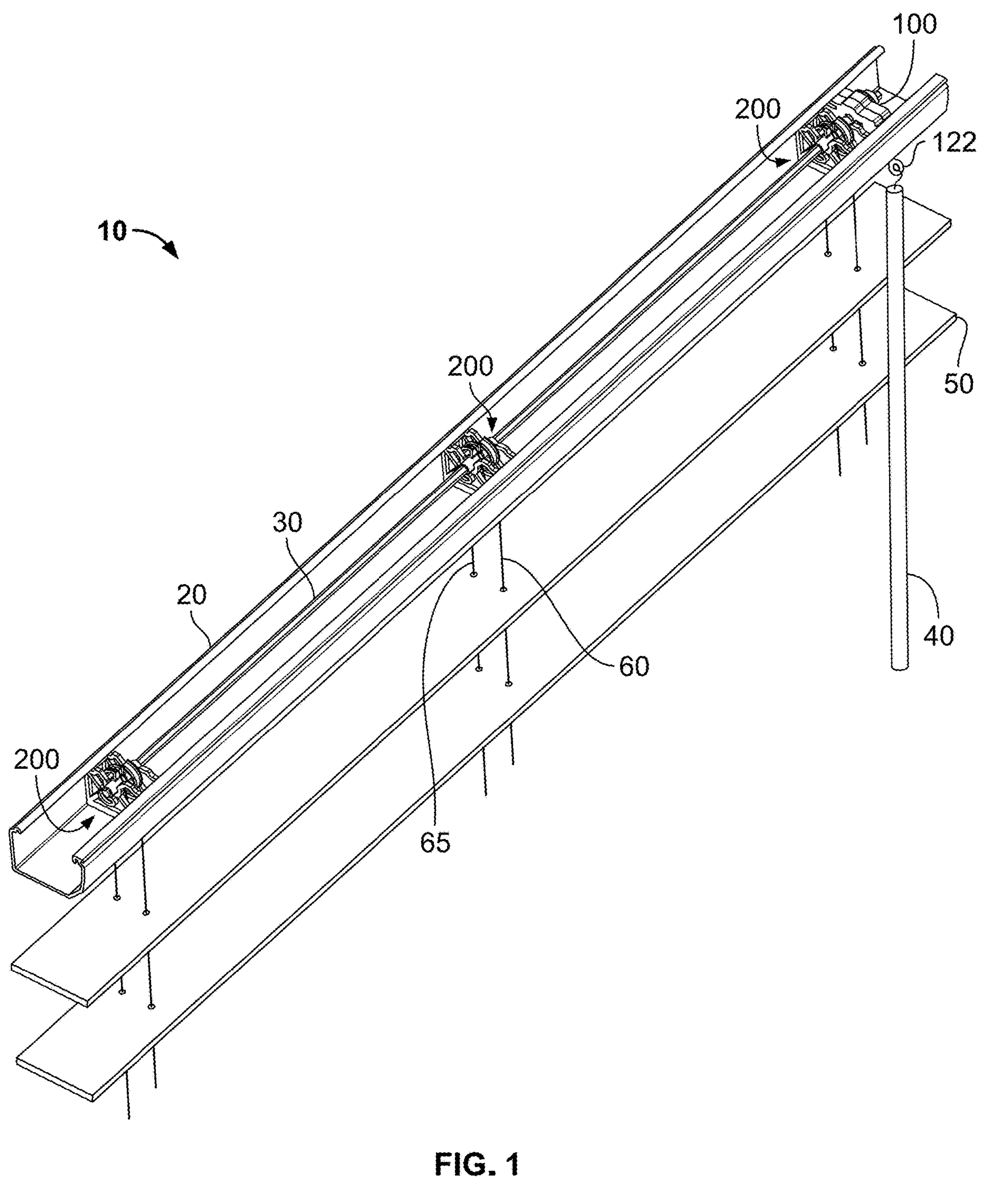
FIG. 1 illustrates a window blind, in accordance with various embodiments of the present invention.

FIG. 1 illustrates a window blind 10, in accordance with various embodiments of the present invention. The window blind 10 includes a headrail 20 and a plurality of slats 50 suspended therebeneath. The window blind 10 also includes a wand 40 that cooperates with a slat angle adjustment mechanism to adjust the angles of the slats 50. The slat angle adjustment mechanism may include, for example, a gear assembly 100, one or more pulley assemblies 200, and a shaft 30 coupling the gear assembly 100 with the pulley assemblies 200. The gear assembly 100 may include an attachment point 122, such as an eyelet, for attaching to the wand 40. The gear assembly 100 may further translate rotational motion of the wand 40 into rotational motion of the shaft 30, which in turn may cause rotational motion within the pulley mechanism 200.

Figure 2:
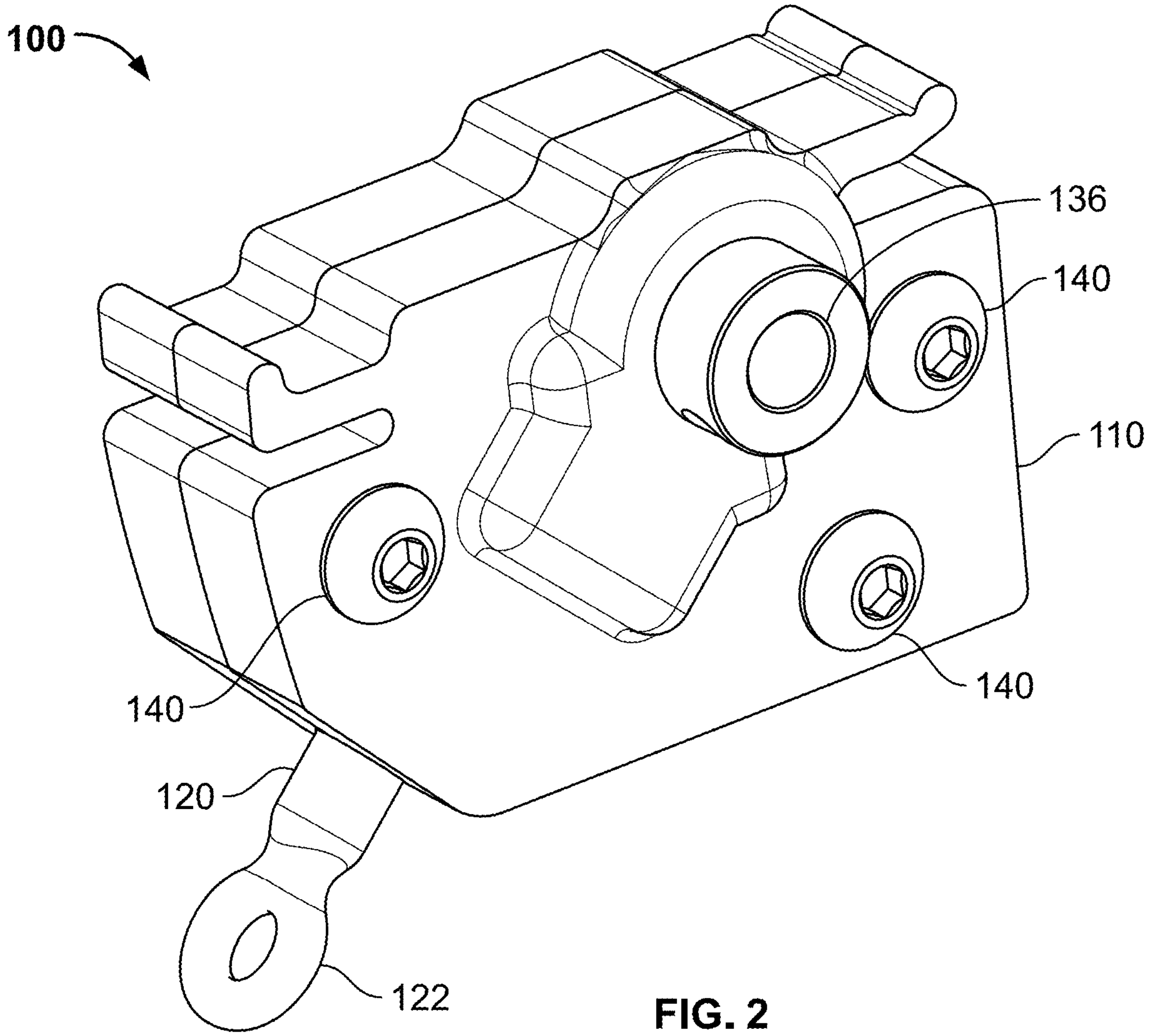
FIG. 2 illustrates a gear assembly in accordance with various embodiments of the present invention.

FIG. 2 illustrates a gear assembly 100 in accordance with various embodiments of the present invention. The gear assembly 100 includes a housing 110, which may be secured together by one or more fasteners, such as bolts 140, or alternatively, the housing 110 may snap together. The gear assembly 100 includes a rod 120 that may extend partially out of the housing 110. The rod 120 includes an attachment point 122 for a wand 40. In the illustrated embodiment, the attachment point 122 is an eyelet, but it should be appreciated that a hook, clasp or any other suitable attachment means may be used instead. The gear assembly 100 may also include an aperture 136 sized and shaped to receive the shaft 30.

Figure 3:
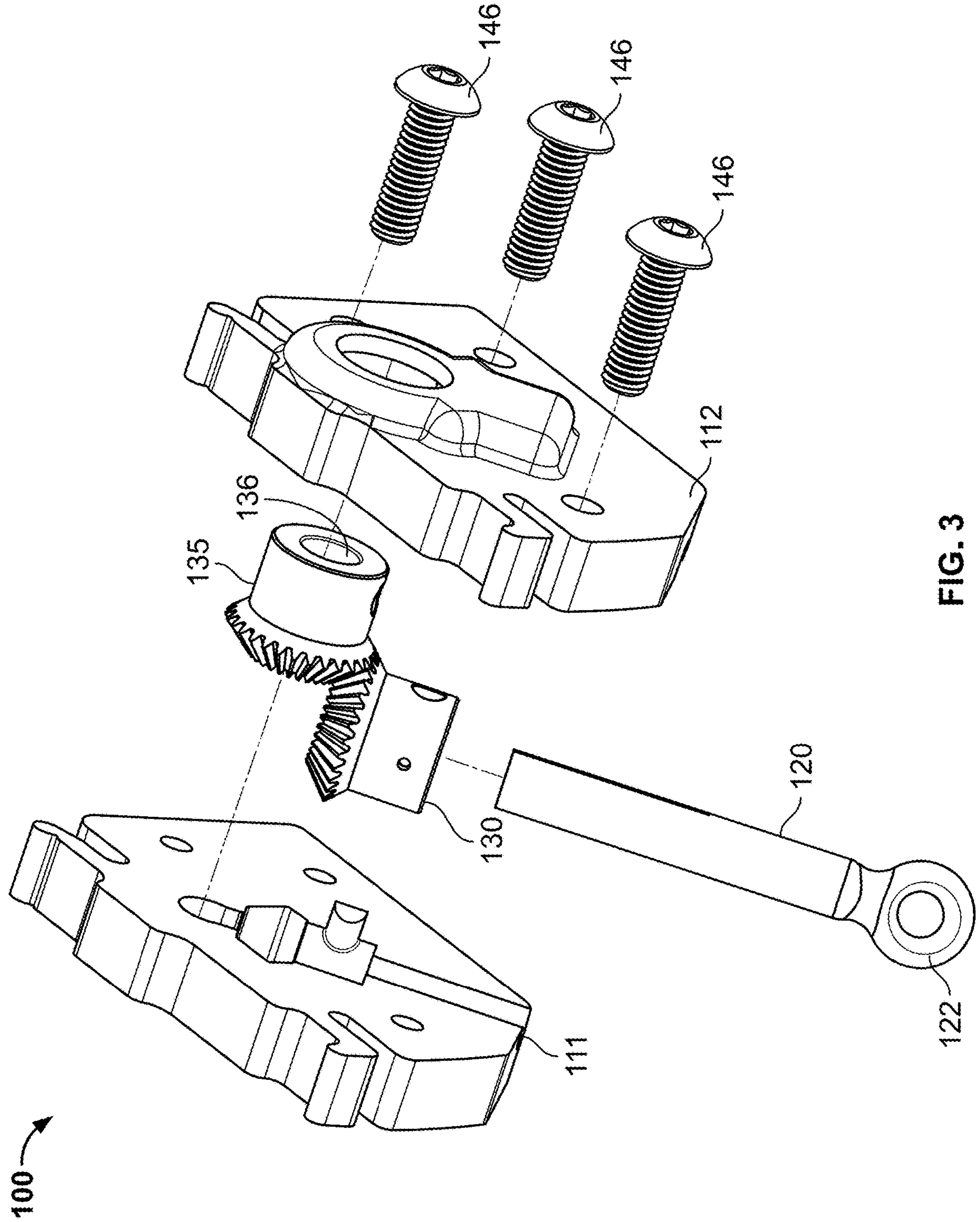
FIG. 3 is an exploded view of the gear assembly of FIG. 2, in accordance with various embodiments of the present invention.

FIG. 3 is an exploded view of the gear assembly 100 of FIG. 2, in accordance with various embodiments of the present invention. As shown, the housing 110 of the gear assembly may be a two-piece construction, comprising a first housing member 111 and a second housing member 112, which may be joined using the bolts 140. The gear assembly 100 also includes a rod 120, having two ends. One end of the rod 120 includes an attachment point 122 for a wand 40. Again, while the illustrated embodiment depicts an eyelet, any other suitable attachment means may be used for the attachment point 120 instead.

The gear assembly 100 may also include one or more bevel gears. In the illustrated embodiment, the gear assembly includes a first bevel gear 130 and a second bevel gear 135 in mechanical communication with each other. The first bevel gear 130 includes a bore (not shown) passing axially therethrough that is sized and shaped to receive the rod 120. When the rod 120 is secured into the bore of the first bevel gear 130, the first bevel gear 130 will rotate with the rod 120. The second bevel gear 135 similarly includes a bore 136 passing axially therethrough that is sized and shaped to receive the shaft 30. When the shaft 30 is secured into the bore 136 of the second bevel gear 135, the shaft 30 will rotate with the second bevel gear 135. Thus, as a result of the mechanical communication between the first bevel gear 130 and the second bevel gear 135, a rotation of the wand 40 will cause a corresponding rotation of the shaft 30. Because the gear assembly 100 utilizes bevel gears, the gear ratio of the gear assembly 100 is relatively low, which in turn leads to faster, more responsive adjustment of the slats 50. For example, a conventional window blind worm gear typically as a gear ratio of between 5:1 and 10:1, whereas some embodiments may have a gear ratio of about 1:1 or less. Thus, the slat angle adjustment mechanisms according to various embodiments are able to adjust slat angle up to 5-10 faster than conventional worm gears.

Figure 4:
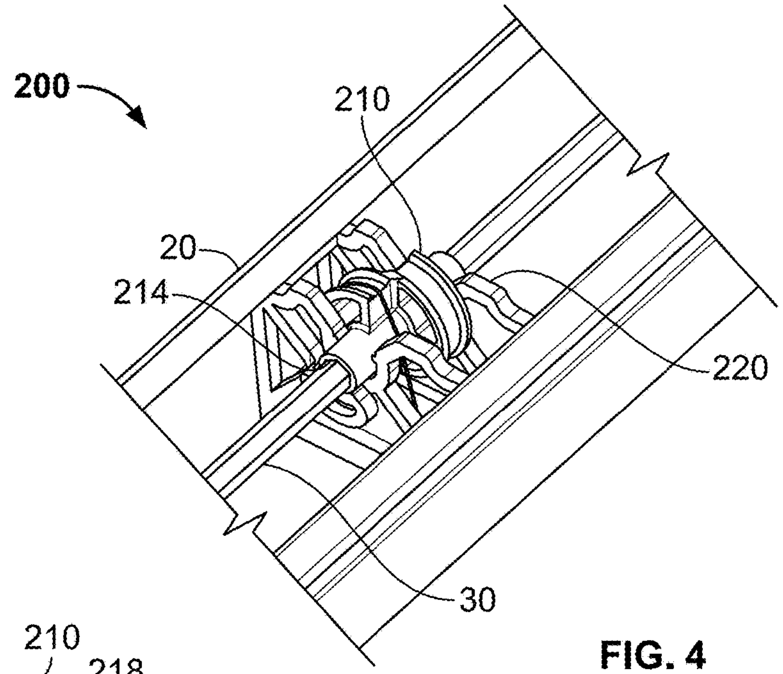
FIG. 4 illustrates a pulley assembly, in accordance with various embodiments of the present invention.

FIG. 4 illustrates a pulley assembly 200, in accordance with various embodiments of the present invention. Window blinds according to various embodiments may have one or more such pulley assemblies 200 spaced along a length of the headrail 20. As shown, the pulley assembly includes a pulley 210 and a bracket 220 for supporting the pulley 210. The pulley 210 includes an aperture 214 that is sized and shaped to receive the shaft 30. As such, the pulley 210 may rotate along with the shaft 30.

Figure 5:
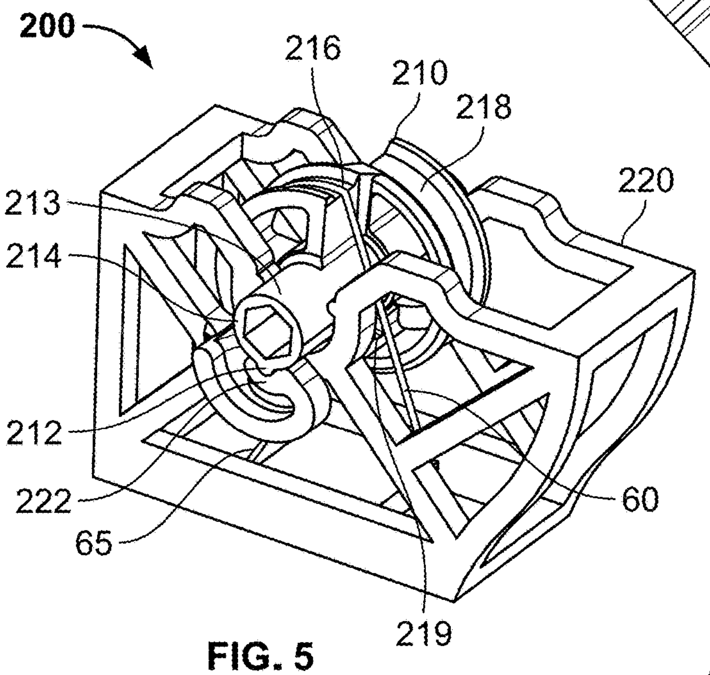
FIG. 5 is an enlarged view of a pulley assembly, in accordance with various embodiments of the present invention.

FIG. 5 is an enlarged view of a pulley assembly 200, in accordance with various embodiments of the present invention. The pulley 210 includes an axle 213 and a plurality of arced portions 216, 218. The arced portions 216, 218 guide respective cords 60, 65 and attach to the cords 60, 65 at respective attachment points 217 (shown in FIG. 6), 219. In various embodiments, the arced portions 216, 218 each have variable radial profiles (discussed in more detail with respect to FIGS. 6 and 7 below), which in turn provides variable torque depending on the rotational position of the pulley 210. In some embodiments, the pulley 210 provides lower torque (and higher speed) at a rotational position generally corresponding to the open position of the slats 50 and increased torque (and reduced speed) at rotational positions corresponding to a closed or an approaching-closed position of the slats 50. For example, the example pulley disclosed in FIGS. 4-7C may provides an output torque that increases non-linearly as the slats to which the pulley is coupled approach an approximately closed position.

The pulley assembly 200 also includes a resistance mechanism that resists back-drive on the pulley when the slats 50 are in the closed position. For example, in the illustrated embodiment, the bracket 220 includes a detent 222 and the pulley includes a corresponding protrusion 212 (e.g. on the axle 213). Thus, when the protrusion 212 seats into the detent 222, they cooperate to resist and/or offset the back-drive caused by the weight of the slats 50 when they are in the closed position. The relative position of the protrusion 212 on the axle 213 when it is seated in the detent 222 corresponds approximately to the closed position of the slats 50.

Figure 6:
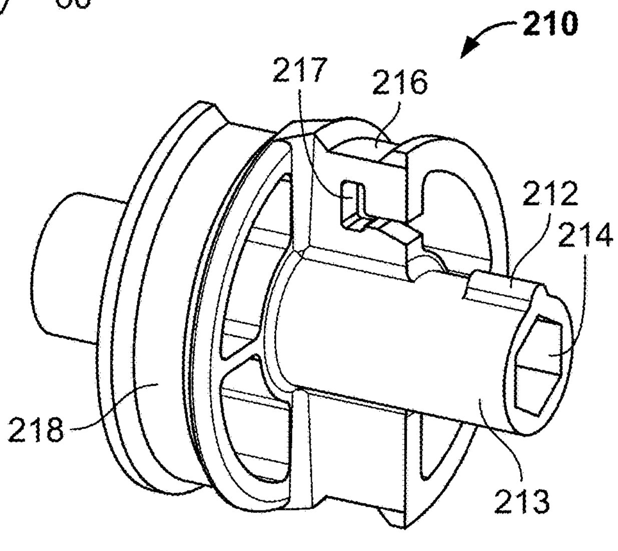
FIG. 6 is an enlarged view of a pulley, in accordance with various embodiments of the present invention.

FIG. 6 is a further enlarged view of the pulley 210, in accordance with various embodiments of the present invention. In the illustrated embodiment, the arced portions 216, 218 have variable radial profiles (e.g. relative to an axis passing through axle 213, in that arced portions 216, 218 each have a generally semi-circular shape. Thus, the radial profiles of each of the arced portions transition from larger radii to smaller radii at the nodes (e.g., corners) of the respective arcs. Although that is an abrupt transition in the example of an arced portion with a semi-circular shape, other shapes could provide for more gradual transitions. For example, arced portions 216, 218 could instead have a cam shape, a spiral shape, or the like. Additionally, in some embodiments, the arced portions 216, 218 may be axially and radially offset so as to provide independent, complementary radial profiles and torque curves for the cords, 60, 65. For example, the arced portions may be radially offset from each other by 180 degrees.

FIG. 6 also shows an example first attachment point 217 for a first cord 60, which in the illustrated embodiment is a notch into which the first cord 60 can be inserted laterally. The portion of the first cord 60 that is to lie behind the first attachment point 217 would either be knotted or otherwise have a collar that would prevent the first cord 60 from being pulled longitudinally through the first attachment point 217, and then the first cord 60 would then be draped over the first arced portion 216. Although not shown in FIG. 6 (but partially shown in FIG. 5), the second arced portion 218 includes a similar, second attachment point 219. In the illustrated example, the second attachment point 219 of the second arced portion 218 would likewise be located on the back side of the second arced portion 218 and, in the orientation of FIG. 6, just below the upper corner of the second arced portion 218.

Figure 7C:
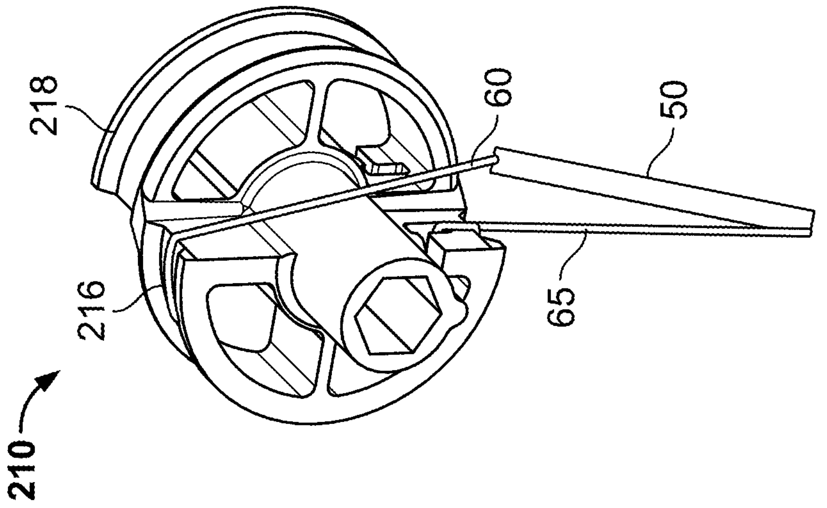
FIG. 7C shows a 180-degree counterclockwise rotation of the pulley of FIG. 7A, in accordance with various embodiments of the present invention.
Figure 7B:
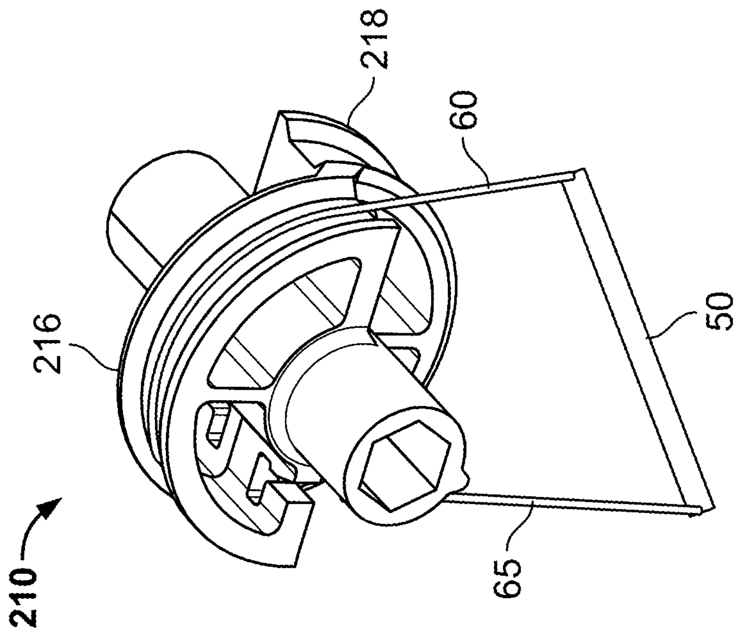
FIG. 7B shows a 90-degree counterclockwise rotation of the pulley of FIG. 7A, in accordance with various embodiments of the present invention.
Figure 7A:
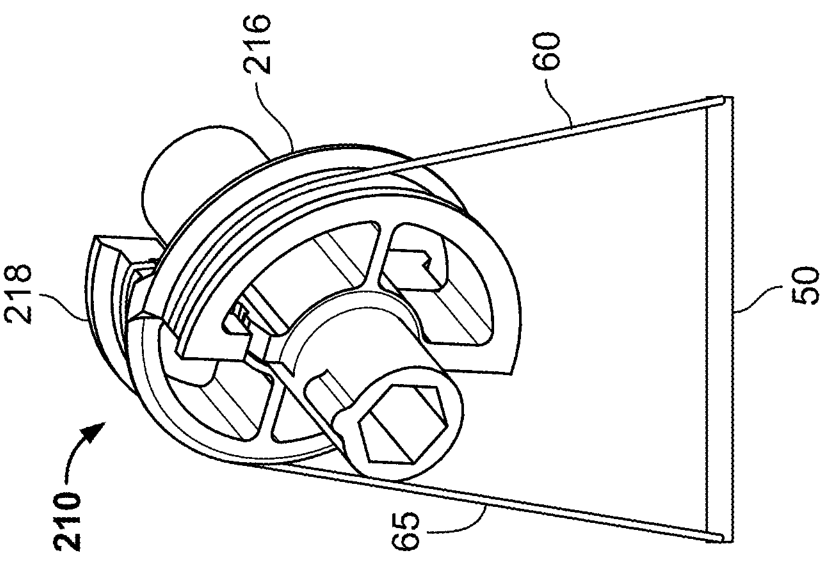
FIG. 7A shows a baseline, zero-degree position of a pulley 210, in accordance with various embodiments of the present invention.

FIGS. 7A-C show a series of images of the pulley 210 and a connected slat 50 at various stages of rotation, in accordance with various embodiments of the present invention. (It should be appreciated that for illustrative purposes, FIGS. 7A-C are not drawn to scale and only depict a single slat 50.) Specifically, FIG. 7A shows a baseline, zero-degree position of the pulley 210, which corresponds to an open (e.g. generally horizontal) position of the slat 50, FIG. 7B shows a 90-degree counterclockwise rotation of the pulley 210, which corresponds to an approximately 45-degree counterclockwise rotation of the slat 50, and FIG. 7C shows a 180-degree counterclockwise rotation of the pulley 210, which corresponds to a closed (e.g. generally vertical) position of the slat 50.

As shown in FIGS. 7A-7C, the first arced portion 216 is coupled with the first cord 60, which is in turn coupled with the front edges of the slats 50, and the second arced portion 218 is coupled with the second cord 65, which is in turn coupled with the rear edges of the slats 50. Thus, counterclockwise rotation of the pulley 210 causes the first arced portion to draw in the first cord 60 and the second arced portion to let out the second cord 65, thereby causing a counterclockwise rotation of the slat 50, and clockwise rotation of the pulley 210 causes the first arced portion 216 to let out the first cord 60 and the second arced portion 218 to draw in the second cord 65, thereby causing the slat 50 to rotate clockwise.

In the illustrated embodiment, as the pulley 210 rotates from the position of FIG. 7A to the position of FIG. 7B, the arced surfaces of the arced portions 216, 218 generally maintain the cords 60, 65 at a constant distance from the axis of the pulley 210, thereby maintaining relatively constant speed and torque. However, starting at the position of FIG. 7B, and continuing to the position of FIG. 7C, the distance between the cord 60 and the axis of the pulley 210 gradually decreases, thereby causing a gradual increase in torque and decrease in speed. Thus, in the process of closing the slat, the angle adjustment mechanism of the illustrated embodiment provides relatively high speed and low torque when the slat 50 is between the open position and approximately 45 degrees of rotation therefrom, and relatively lower speed and higher torque when the slat 50 is between approximately the 45 degree and closed positions of the slat 50. More specifically, the torque of the slat angle adjustment mechanism increases so that a maximum torque is provided as the slats 50 approach the closed position.

Thus, various embodiments provide for a window blind slat angle adjustment mechanism that is generally high speed, but also decreases speed and provides increased torque when needed to completely close the blinds. The mechanism also resists back-drive, so as to keep the blinds closed. Such embodiments provide a significant improvement in speed and ease of use over conventional worm gear-based mechanisms, which can be up to 5-10 times slower and therefore require significantly more turns of the adjustment wand to open or close the blinds.

Aspects of the slat angle adjustment mechanism described herein, including the gear assembly 100, may enable joint manual and motorized actuation of a window blind 10. In contrast, known pulley assemblies, including pulley assemblies including worm gears, are not suitable for motorized actuation, or for joint manual and motorized actuation. In particular, a worm gear-based gear assembly for rotating slats of a window blind does not permit direct actuation of the shaft 30 by a second actuator, because the worm gear coupling with the wand 40 does not permit the worm gear to turn the wand 40, and thus that coupling resists direct actuation of the shaft 30. In contrast, a gear assembly 100 according to the present disclosure (including, e.g., the bevel gears 130, 135) is capable of actuation by a wand, as described above, as well as direct actuation of the drive shaft by a second actuator. In some embodiments, that second actuator may be a motor, for example.

Because a slat angle adjustment mechanism according to the present disclosure enables direct actuation of the shaft 30 by a secondary actuator, such as a motor, a slat angle adjustment assembly according to the present disclosure also enables a window blind without a motor (but which includes a bevel gear-based gear assembly 100, for example) to be retrofitted with a motor without altering the gear assembly. Such retrofitting capability improves upon known window blinds, such as worm gear-based window blinds, which require altering the gear train or removing the manual actuator for the blind (e.g., the wand and associated gear assembly) to permit motorized actuation. In contrast, a window blind according to the present disclosure may be simply retrofitted with a motor, and then jointly actuated with the motor and with the manual actuator (e.g., wand 40).

Figure 8:
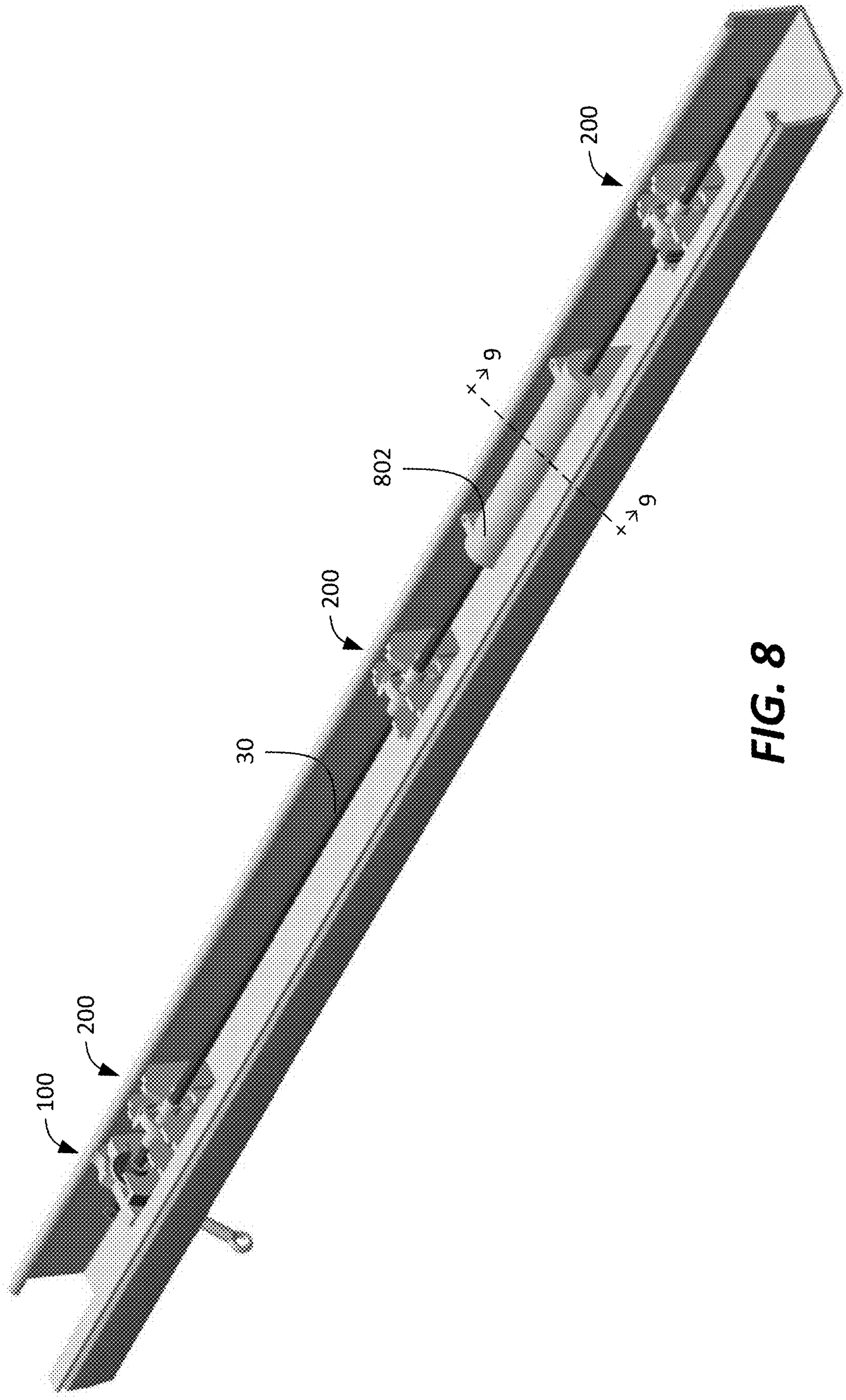
FIG. 8 is a perspective view of an example window blind slat angle adjustment assembly that includes a motor.

FIG. 8 is a perspective view of an example window blind slat angle adjustment assembly 800 that includes a motor 802. The slat angle adjustment assembly 800 may include a gear assembly 100, one or more pulley assemblies 200, a motor 802, and a shaft 30 coupling the gear assembly 100 and motor 802 with the pulley assemblies 200. As described above, the gear assembly 100 may be manually actuated by a user through the use of a wand 40 (shown in FIG. 1) coupled to the gear assembly 100. In turn, the gear assembly 100 may turn the shaft 30. In addition, the motor 802 may be directly coupled to the shaft 30 to turn the shaft. In some embodiments, as illustrated in FIG. 8, the shaft 30 may extend through the motor 802, such that rotational operation of the motor 802 rotates the shaft 30. As a result, rotational operation of the motor 802 may rotate the bevel gears 130, 135 of the gear assembly 100, and also the wand 40.

The motor 802 may be coupled to the shaft 30 between two pulley assemblies 200, in some embodiments. In another embodiment, the motor 802 may be coupled to the end portion of the shaft 30. Whether between two pulley assemblies 200 or on the end portion of the shaft 30, the motor 802 may be disposed adjacent to a pulley assembly 200.

The motor 802 may be any suitable motor, such as a brushed, brushless, or servo motor, in various embodiments. The motor 802 may directly drive the shaft 30, or may be or may include a geared motor with a clutch system, in various embodiments. The motor 802 may be battery-powered, or may be electrically coupled with a power source associated with the structure in which the window blind 10 is placed. The motor 802 may be sized and shaped to fit within the headrail 20. Accordingly, the motor 802 may have a depth of two inches or less and a height of one and a half inches or less, in some embodiments, where both the depth and height are perpendicular to the direction of extension of the shaft 30. The motor 802 may have a length of three and a half inches or less, in some embodiments (e.g., where the motor 802 is disposed on an end portion of the shaft 30). In other embodiments, the motor 802 may have a length of eight inches or less (e.g., where the motor 802 is disposed between two pulley assemblies 200). In other embodiments, the dimensions of the motor 802 may be tailored to the available space in the headrail 20.

Figure 9:
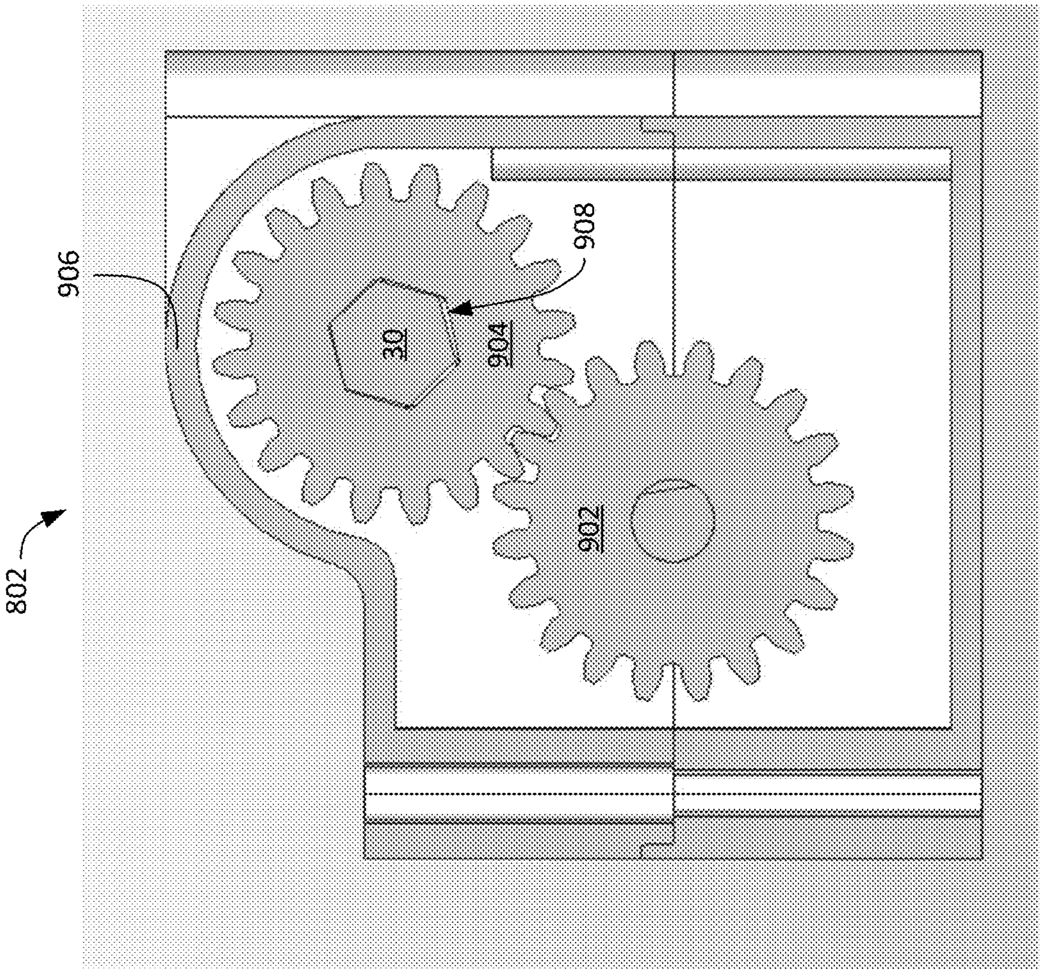
FIG. 9 is a cross-sectional view of an example motor that may find use in the assembly of FIG. 8.

FIG. 9 is a cross-sectional view of the motor 802, taken along line 9-9 in FIG. 8. As illustrated, the motor 802 may be or may include a brushless DC motor. The motor 802 may include, in some embodiments, a rotor 902 and a secondary gear 904 that is mechanically coupled to the rotor 902, both disposed within a motor housing 906. The secondary gear 904 may be rigidly coupled with the shaft 30 to rotate the shaft 30 responsive to rotation of the rotor 902. The secondary gear 904 may include an aperture 908 through which the shaft 30 may extend. The motor housing 906 may define a battery compartment in which a battery may be disposed for powering the rotor 902. Referring to FIG. 8, the motor housing 906 may define apertures 804 at the ends of the motor housing 906 through which the shaft may extend (one aperture 804 is labeled in FIG. 8, with the other obscured by the motor 802).

Figure 10:
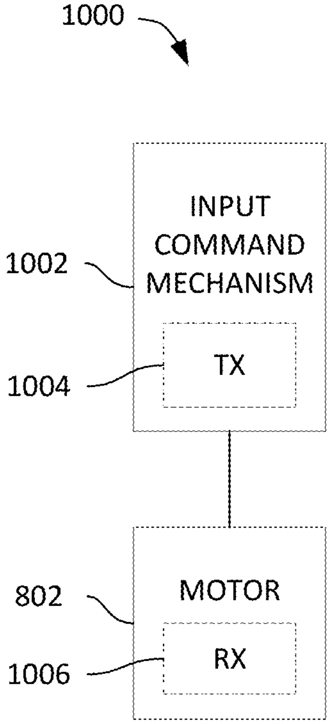
FIG. 10 is a diagrammatic view of an example window blind slat angle adjustment system that includes a motor.

FIG. 10 is a diagrammatic view of an example window blind slat angle adjustment system 1000 including a motor 802. The motor 802 may accept input commands from an input command mechanism 1002, responsive to which the motor 802 may rotate the shaft 30. The input command mechanism 1002 may include, for example, a switch (e.g., a button, lever, etc.) that may be provided on or near the headrail 20 (shown in FIG. 1). Additionally or alternatively, the switch may be provided proximate the window blind 10, or elsewhere. Such a switch may be communicatively coupled with the motor 802. Such communicative coupling may be wired or wireless, in embodiments. Accordingly, the input command mechanism 1002 may include a wired or wireless transmitter 1004, and the motor 802 may include or may be electrically coupled with a wired or wireless receiver 1006, for effecting communications from the switch to the motor 802. The transmitter 1004 and receiver 1006 may communicate via Bluetooth, Wi-Fi, RF, or any other appropriate communications protocol.

In some embodiments, the input command mechanism 1002 may be or may include an electronic application (in the form of instructions stored on a non-transitory, computer-readable memory) and/or an electronic device executing such an application (e.g., a processor executing such instructions). The electronic device application may be configured for execution by a mobile computing device such as a mobile phone or tablet, and/or by a personal computer, etc. In some embodiments, the input command mechanism 1002 may be a mobile computing device application which may receive user commands through a graphical user interface and, in response, cause the mobile computing device to issue commands to the motor 802. The electronic application may cause a signal to be transmitted by the electronic device to the motor 802 to command actuation of the motor 802.

The motor 802 may be configured to receive commands from the input command mechanism 1002 and, in response, to turn the shaft 30 of the window blind 10 to either open or close the slats of the window blind 10. In some embodiments, the motor 802 may include a rotational position sensor and may be configured to automatically cease actuation when the rotational position of the motor indicates that the blind 10 is fully closed.

Figure 11:
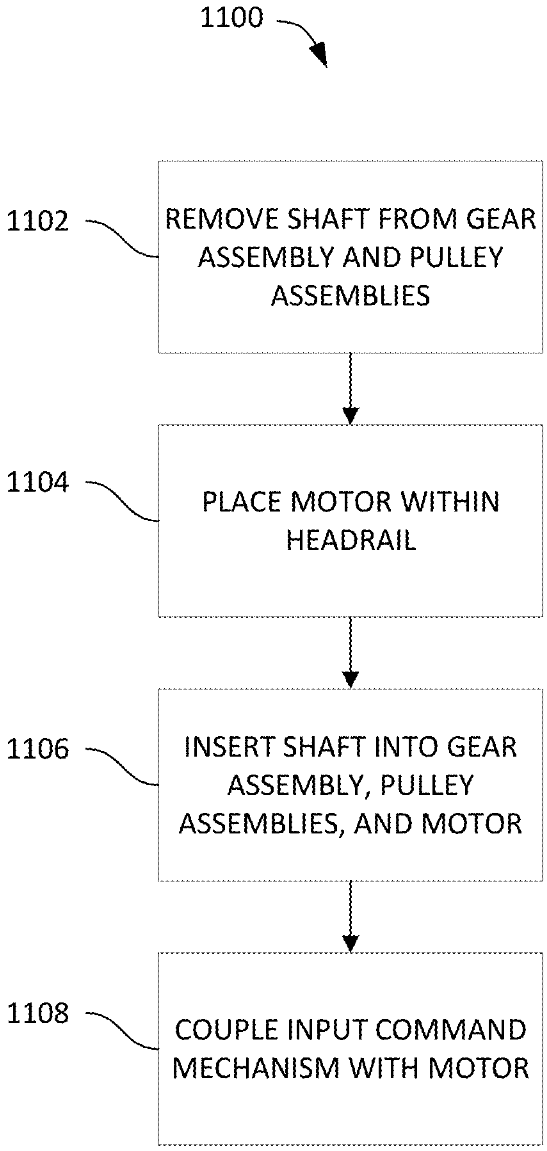
FIG. 11 is a flow chart illustrating an example method of retrofitting a blind slat angle adjustment assembly to include a motor.

As noted above, the gear assembly 100 may uniquely enable joint motorized and manual actuation of a window blind 10. Accordingly, a window blind 10 including a gear assembly 100 may be retrofitted with a motor 802, in some embodiments. FIG. 11 is a flow chart illustrating an example method 1100 of retrofitting a blind slat angle adjustment assembly to include a motor. The method 1100 of FIG. 11 will be described with reference to FIGS. 8-11.

The method 1100 may include a step 1102 that includes removing the shaft 30 from the gear assembly 100 and from one or more pulley assemblies 200. The shaft 30 may be removed while the gear assembly 100 and pulley assemblies 200 remain in the headrail 20, in some embodiments. In other embodiments, the gear assembly 100, pulley assemblies 200, and shaft 30 may be removed from the headrail 20 before the shaft 30 is removed from the gear assembly 100 and pulley assemblies 200.

The method 1000 may further include a step 1104 that includes placing the motor 802 within the headrail 20 and a step 1106 that includes inserting the shaft 30 into the gear assembly 100, into the one or more pulley assemblies 200, and into the motor 802. Inserting the shaft 30 into the motor 802 may include threading the shaft 30 through one or more apertures 804 in the motor housing 906 and/or through an aperture 908 in a secondary gear 904 of the motor 802, in some embodiments. In some embodiments, step 1104 may be performed before step 1106. In other embodiments, step 1106 may be performed before step 1104.

The method 1100 may further include a step 1108 that includes coupling an input command mechanism 1002 with the motor 802. The input command mechanism 1002 may be coupled, for example, by establishing a wired connection between the input command mechanism 1002 and the motor 802. In another example, the input command mechanism 1002 may be coupled by establishing a wireless communication channel between the input command mechanism 1002 and the motor 802. A wireless communication channel may be established over a Bluetooth, Wi-Fi, RF, or other protocol. Establishing a wireless communication channel may be performed through a mobile electronic device application, in some embodiments, such as by pairing the mobile electronic device to the motor 802 over a Bluetooth connection, adding the motor 802 to a list of Wi-Fi-controlled devices on the mobile electronic device, associating the motor with a user account or application instance associated with the mobile electronic device, etc.

Figure 12:
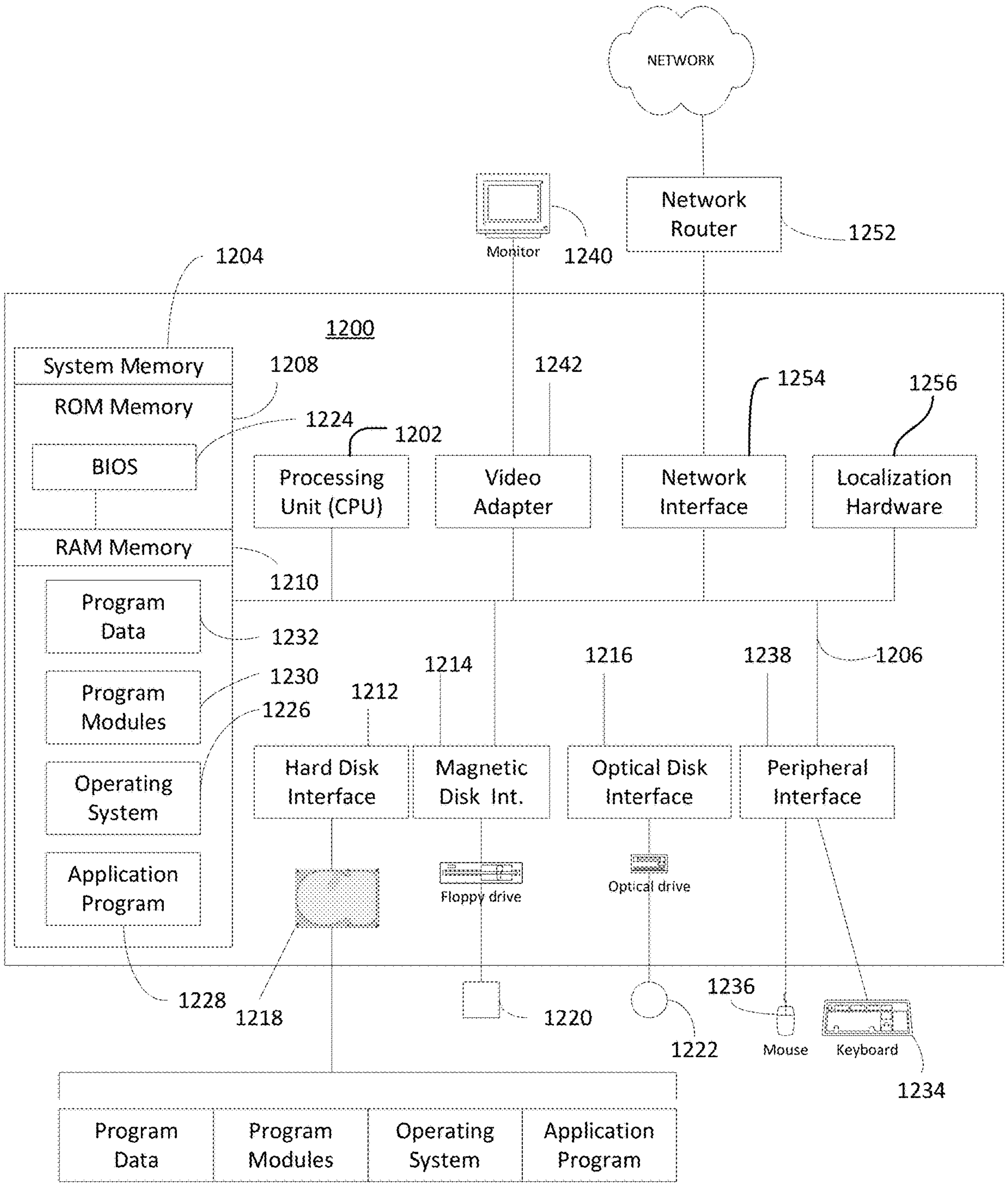
FIG. 12 is a diagrammatic view of an example computing system that includes a general purpose computing system environment that may find use with the system of FIG. 11.

FIG. 12 is a diagrammatic view of an illustrative computing system that includes a general purpose computing system environment 1200, such as a desktop computer, laptop, smartphone, tablet, or any other such device having the ability to execute instructions, such as those stored within a non-transient, computer-readable medium. Furthermore, while described and illustrated in the context of a single computing system 1200, those skilled in the art will also appreciate that the various tasks described hereinafter may be practiced in a distributed environment having multiple computing systems 1200 linked via a local or wide-area network in which the executable instructions may be associated with and/or executed by one or more of multiple computing systems 1200. Computing system environment 1200, or portions thereof, may find use as an input command mechanism 1002, in some embodiments.

In its most basic configuration, computing system environment 1200 typically includes at least one processing unit 1202 and at least one memory 1204, which may be linked via a bus 1206. Depending on the exact configuration and type of computing system environment, memory 1204 may be volatile (such as RAM 1210), non-volatile (such as ROM 1208, flash memory, etc.) or some combination of the two. Computing system environment 1200 may have additional features and/or functionality. For example, computing system environment 1200 may also include additional storage (removable and/or non-removable) including, but not limited to, magnetic or optical disks, tape drives and/or flash drives. Such additional memory devices may be made accessible to the computing system environment 1200 by means of, for example, a hard disk drive interface 1212, a magnetic disk drive interface 1214, and/or an optical disk drive interface 1216. As will be understood, these devices, which would be linked to the system bus 1206, respectively, allow for reading from and writing to a hard disk 1218, reading from or writing to a removable magnetic disk 1220, and/or for reading from or writing to a removable optical disk 1222, such as a CD/DVD ROM or other optical media. The drive interfaces and their associated computer-readable media allow for the nonvolatile storage of computer readable instructions, data structures, program modules and other data for the computing system environment 1200. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 1200.

A number of program modules may be stored in one or more of the memory/media devices. For example, a basic input/output system (BIOS) 1224, containing the basic routines that help to transfer information between elements within the computing system environment 1200, such as during start-up, may be stored in ROM 1208. Similarly, RAM 1210, hard drive 1218, and/or peripheral memory devices may be used to store computer executable instructions comprising an operating system 1226, one or more applications programs 1228 (such as a Web browser, motor input command application, and/or other applications that execute the methods and processes of this disclosure), other program modules 1230, and/or program data 1232. Still further, computer-executable instructions may be downloaded to the computing environment 1200 as needed, for example, via a network connection.

An end-user, e.g., a blinds operator end user, may enter commands and information into the computing system environment 1200 through input devices such as a keyboard 1234 and/or a pointing device 1236. While not illustrated, other input devices may include a microphone, a joystick, a game pad, a scanner, etc. These and other input devices would typically be connected to the processing unit 1202 by means of a peripheral interface 1238 which, in turn, would be coupled to bus 1206. Input devices may be directly or indirectly connected to processor 1202 via interfaces such as, for example, a parallel port, game port, firewire, or a universal serial bus (USB). To view information from the computing system environment 1200, a monitor 1240 or other type of display device may also be connected to bus 1206 via an interface, such as via video adapter 1242. In addition to the monitor 1240, the computing system environment 1200 may also include other peripheral output devices, not shown, such as speakers and printers.

The computing system environment 1200 may also utilize logical connections to one or more computing system environments. Communications between the computing system environment 1200 and the remote computing system environment may be exchanged via a further processing device, such a network router 1252, that is responsible for network routing. Communications with the network router 1252 may be performed via a network interface component 1254. Thus, within such a networked environment, e.g., the Internet, World Wide Web, LAN, or other like type of wired or wireless network, it will be appreciated that program modules depicted relative to the computing system environment 1200, or portions thereof, may be stored in the memory storage device(s) of the computing system environment 1200.

The computing system environment 1200 may also include localization hardware 1256 for determining a location of the computing system environment 1200. In embodiments, the localization hardware 1256 may include, for example only, a GPS antenna, an RFID chip or reader, a Wi-Fi antenna, or other computing hardware that may be used to capture or transmit signals that may be used to determine the location of the computing system environment 1200.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

What is claimed is:

1. An apparatus for adjusting a tilt angle of a plurality of slats in a window blind, the window blind including a headrail having disposed therein a shaft that causes the tilt angle of the slats to be adjusted when the shaft is rotated, the apparatus comprising:

a rod having a first end and a second end, the first end adapted to couple with a wand;

a rotational position sensor configured to generate a signal indicative of the tilt angle of the slats;

a first bevel gear coupled with the rod;

a second bevel gear in mechanical communication with the first bevel gear, the second bevel gear comprising a bore passing axially therethrough that is sized and shaped to receive the shaft and coupled with the shaft; and a motor comprising a bore passing axially therethrough that is sized and shaped to receive the shaft and coupled to the shaft;

wherein a rotation of the wand causes a corresponding rotation of the shaft to adjust the tilt angle of the slats;

wherein actuation by the motor causes a rotation of the shaft to adjust the tilt angle of the slats;

wherein actuation by the motor causes a rotation of the first bevel gear, second bevel gear, rod, and wand; and wherein actuation by the motor automatically ceases in response to the signal from the rotational position sensor indicating that the window blind is closed.

2. The apparatus of claim 1, wherein the motor is disposed within the headrail.

3. The apparatus of claim 2, further comprising two pulleys coupled with the shaft and the slats, wherein the pulleys cause adjustment of the tilt angle of the slats in response to rotation of the shaft, wherein the pulleys are disposed within the headrail.

4. The apparatus of claim 3, wherein the motor is disposed between the two pulleys.

5. The apparatus of claim 1, wherein:

the first bevel gear comprises a bore passing axially therethrough that is sized and shaped to receive the second end of the rod, wherein the first bevel gear rotates with the rod, and the second bevel gear comprises the bore passing axially therethrough that is sized and shaped to receive the shaft, wherein the shaft rotates with the second bevel gear.

6. The apparatus of claim 1, wherein the gear ratio of the second gear relative to the first gear is equal to or less than 1:1.

7. A system comprising:

an apparatus for adjusting a tilt angle of a plurality of slats in a window blind, the window blind including a headrail having disposed therein a shaft that causes the tilt angle of the slats to be adjusted when the shaft is rotated, the apparatus comprising:

a rod having a first end and a second end, the first end adapted to couple with a wand;

a rotational position sensor configured to generate a signal indicative of the tilt angle of the slats;

a first bevel gear coupled with the rod;

a second bevel gear in mechanical communication with the first bevel gear, the second bevel gear comprising a bore passing axially therethrough that is sized and shaped to receive the shaft and coupled with the shaft; and a motor comprising a bore passing axially therethrough that is sized and shaped to receive the shaft and coupled to the shaft;

wherein a rotation of the wand causes a corresponding rotation of the shaft to adjust the tilt angle of the slats;

wherein actuation by the motor causes a rotation of the shaft to adjust the tilt angle of the slats;

wherein actuation by the motor causes a rotation of the first bevel gear, second bevel gear, rod, and wand; and an input command mechanism configured for communication with the motor, wherein user actuation of the input command mechanism causes the input command mechanism to command actuation of the motor, and wherein actuation of the motor automatically ceases in response to the signal from the rotational position sensor indicating that the window blind is closed.

8. The system of claim 7, wherein the input command mechanism comprises computer-readable instructions that, when executed by a processor, cause the processor to command actuation of the motor.

9. The system of claim 8, wherein the input command mechanism comprises an application for a mobile computing device.

10. The system of claim 9, wherein the input command mechanism comprises the mobile computing device.

11. The system of claim 7, further comprising a receiver, coupled to the motor, configured to receive actuation commands from the input command mechanism wirelessly.

12. The system of claim 7, wherein:

the first bevel gear comprises a bore passing axially therethrough that is sized and shaped to receive the second end of the rod, wherein the first bevel gear rotates with the rod, and the second bevel gear comprises the bore passing axially therethrough that is sized and shaped to receive the shaft, wherein the shaft rotates with the second bevel gear.

13. An apparatus for adjusting a tilt angle of a plurality of slats in a window blind, the window blind including a headrail having disposed therein a shaft that causes the tilt angle of the slats to be adjusted when the shaft is rotated, the apparatus comprising:

a rotational position sensor configured to generate a signal indicative of the tilt angle of the slats;

a first bevel gear comprising a bore passing axially therethrough that is perpendicular to the shaft;

a second bevel gear in mechanical communication with the first bevel gear, the second bevel gear comprising a bore passing axially therethrough that is sized and shaped to receive the shaft and coupled with the shaft; and a motor comprising a bore passing axially therethrough that is sized and shaped to receive the shaft and coupled to the shaft;

wherein actuation of the first bevel gear causes a corresponding rotation of the shaft to adjust the tilt angle of the slats;

wherein actuation by the motor causes a rotation of the shaft to adjust the tilt angle of the slats;

wherein actuation by the motor causes a rotation of the first bevel gear and second bevel gear; and wherein actuation of the motor automatically ceases in response to the signal from the rotational position sensor indicating that the window blind is closed.

14. The apparatus of claim 13, wherein the bore of the first bevel gear is configured to receive a rod for manual actuation of the slats, wherein the first bevel gear rotates with the rod.

15. The apparatus of claim 13, wherein the second bevel gear comprises the bore passing axially therethrough that is sized and shaped to receive the shaft, wherein the shaft rotates with the second bevel gear.

16. The apparatus of claim 13, further comprising two pulleys coupled with the shaft and the slats, wherein the pulleys cause adjustment of the tilt angle of the slats in response to rotation of the shaft, wherein the pulleys are disposed within the headrail.

17. The apparatus of claim 13, wherein the gear ratio of the second gear relative to the first gear is equal to or less than 1:1.

* * * * *